Feb. 28, 1967 T. L. DOKTOR ET AL 3,307,149

CONTROL LOGIC CIRCUIT FOR SUBSCRIBER DATA SET CARRIER SIGNAL THRESHOLD MONITOR

Filed Dec. 28, 1962 7 Sheets-Sheet 1

INVENTORS: T. L. DOKTOR
G. PARKER
H. M. ZYDNEY

BY

ATTORNEY

United States Patent Office 3,307,149
Patented Feb. 28, 1967

3,307,149

CONTROL LOGIC CIRCUIT FOR SUBSCRIBER DATA SET CARRIER SIGNAL THRESHOLD MONITOR

Theodore L. Doktor, Flushing, and George Parker and Herbert M. Zydney, New York, N.Y., assignors to Bell Telephone Laboratories, Incorporated, New York, N.Y., a corporation of New York Filed Dec. 28, 1962, Ser. No. 248,045
6 Claims. (Cl. 340—167)

This invention relates to control circuits for data transmission sets and, more particularly, to control circuits for monitoring the conditions of received data signals.

A broad object of this invention is to provide an improved control circuit for a data signal receiver.

Subscriber data transmission sets are now arranged to communicate over the telephone switching network by a frequency shifted voice frequency carrier signal. The data set preferably includes a timing circuit for conditioning the data set for message transmission when a prolonged data "mark" signal is received and terminating message transmission when a prolonged data "space" signal is received or the carrier signal level falls below a predetermined threshold. Accordingly, these sets include a discriminator for detecting the data signals and a carrier detector for monitoring the level of the carrier signal. The discriminator output and the carrier detector output are then combined to provide, for example, a data "mark" signal when a marking signal is received in the presence of the carrier and a data "space" signal when a spacing signal is received or the carrier level falls below a predetermined threshold. This arrangement, however, must necessarily provide a correspondence in the outputs of the discriminator and the carrier detector since the timing circuit acts upon the combined outputs.

Accordingly, it is an object of this invention to control a data transmission set in response to the independent outputs of the discriminator and carrier detector.

In accordance with the illustrated embodiment of the present invention, the outputs of the discriminator and carrier detector are directly and independently applied to a logic circuit which constitutes the input for the timing circuit. Initially, the logic circuit requires the combination of a received marking signal and the presence of the carrier to operate the timing circuit. The timing circuit, upon operation, then rearranges the logic circuit whereby a received spacing signal or the loss of carrier is thereafter required to operate the timing circuit.

Figure 1:
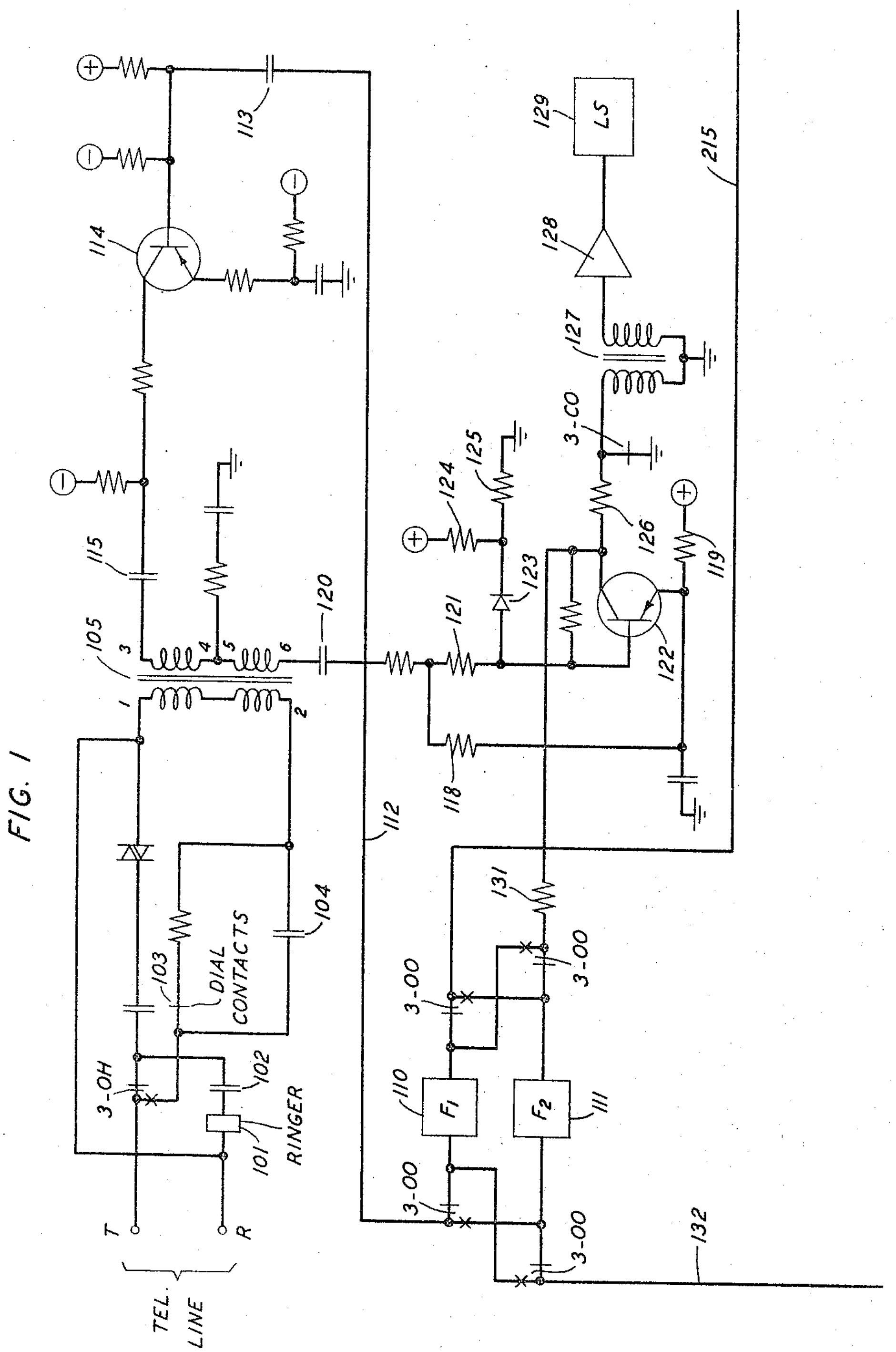
Figure 2:
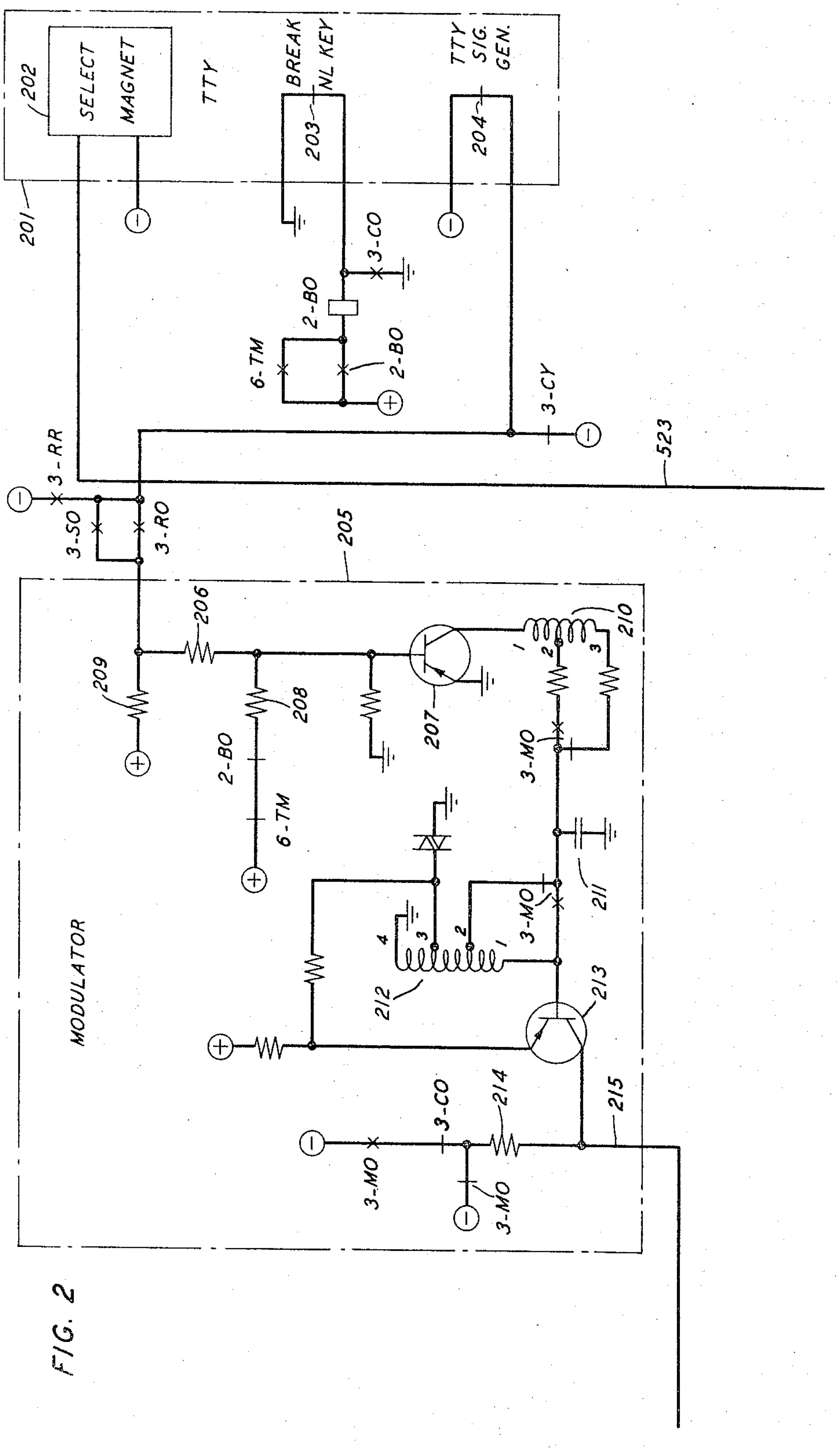
Figures 3, 7:
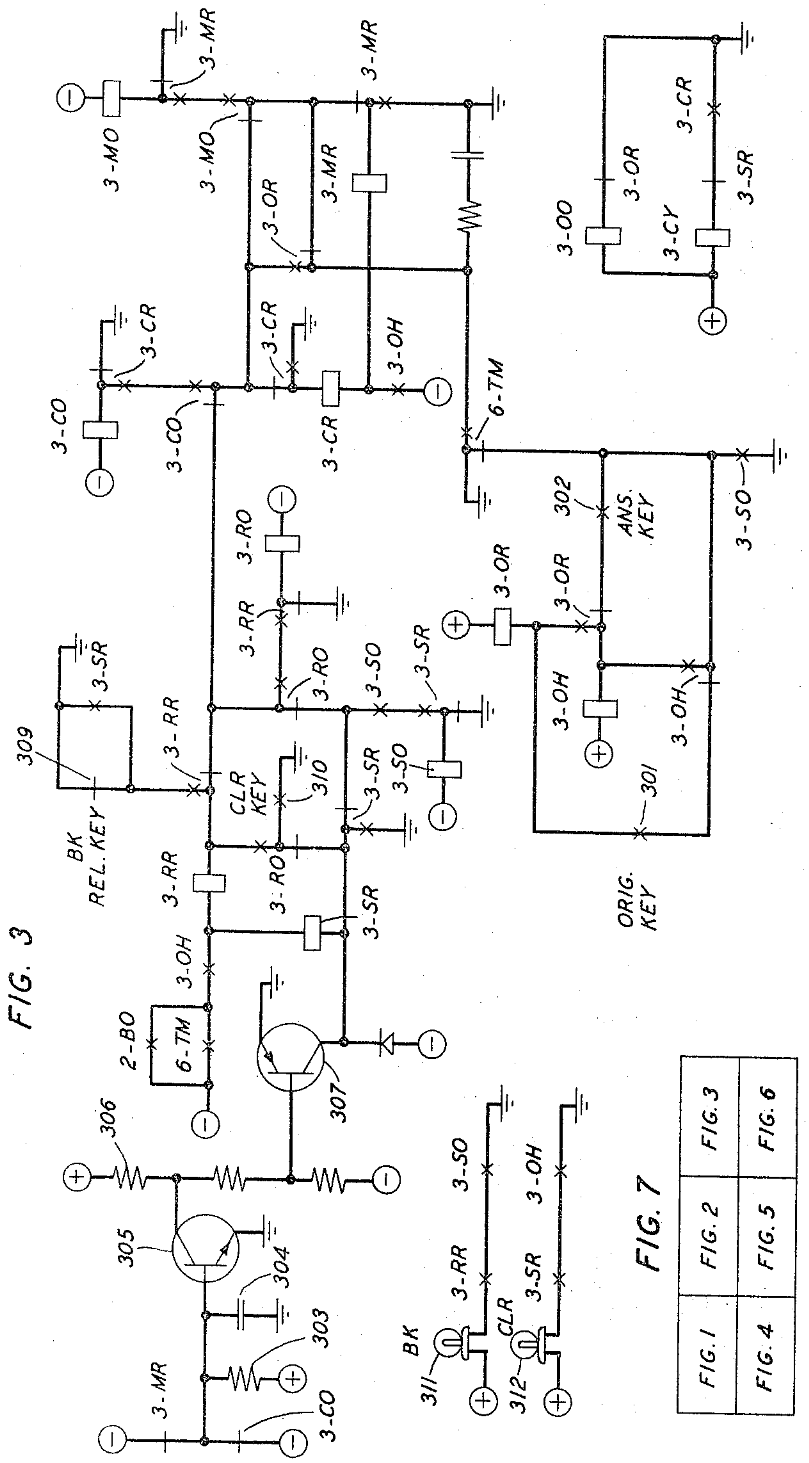
Figure 8:
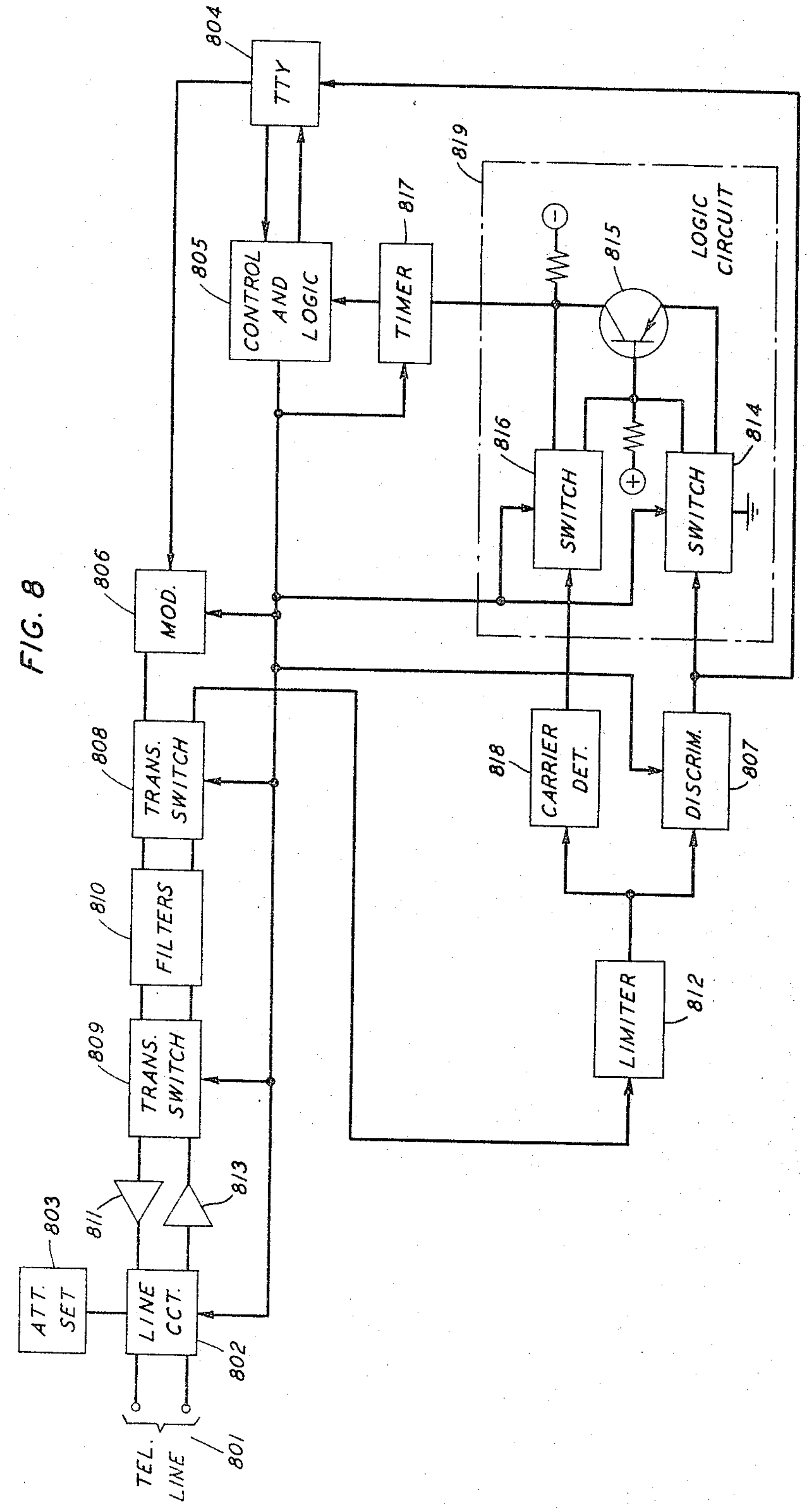

The foregoing and other objects and features of this invention will be fully understood from the following description and an illustrated embodiment thereof taken in conjunction with the accompanying drawings wherein:

FIGS. 1 through 6, when arranged as shown in FIG. 7, show the details of circuits and equipment which cooperate to form a data transmission set in accordance with this invention; and FIG. 8 illustrates, in block form, the various equipment and circuits of the data set and the manner in which they cooperate.

In several figures of the drawing the relay contacts are shown detached from the relay winding and identified by the same designation as the relay core. Contacts which are closed when the associated relay is de-energized, known as "break contacts" are represented by a single short line perpendicular to the conductor line, while contacts which are open when the relay is energized, known as "make contacts" are represented by two short cross lines diagonally intersecting the conductor line.

*General description*

Referring now to FIG. 8, a telephone line 801 is shown extending from line circuit 802 of the data set to a conventional telephone switching office (not shown). Connected to line circuit 802 is attendant's set 803 which includes the conventional telephone dial, a bell ringer, and a listen-only handset. Included in the data set is teletypewriter 804 which includes signal transmitting contacts and printing telegraph apparatus. In addition, teletypewriter 804 is provided with a "break" key for transmitting the "break" signal. Additional apparatus is provided in control and logic circuit 805. This apparatus includes an originating key for initiating a call, an answering key for receiving a call, a clearing key for terminating a call, a "break" lamp, a "clear" lamp and a "break" release key.

Each station has a frequency shift modulator, generally indicated by block 806, and a frequency shift discriminator, generally indicated by block 807. Modulator 806 and discriminator 807 are able to operate within either of two frequency bands, the particular band selected depending upon whether the station is originating a call or answering a call. During data transmission a calling station transmits signals in the lower one of the frequency bands, hereinafter referred to as the $F_1$ band, and receives signals in the upper frequency band, hereinafter referred to as the $F_2$ band. Conversely, an answering station transmits signals in the $F_2$ band and receives signals in the $F_1$ band.

In the initial condition, the output of modulator 806 is connected to line circuit 802 by way of transfer switch 808, an appropriate bandpass filter in filters 810 arranged to pass signals in the $F_2$ band, transfer switch 809 and amplifier 811. Transfer switches 808 and 809 also connect line circuit 802 to discriminator 807 by way of amplifier 813, the appropriate bandpass filter in filters 810 arranged to pass signals in the $F_1$ band and limiter 812. As described hereinafter, when the data set is arranged to operate as a calling station, transfer switches 808 and 809 function to transfer the output of modulator 806 to the bandpass filter in filters 810 arranged to pass signals in the $F_1$ band and to connect the input of discriminator 807 to the bandpass filter in filters 810 arranged to pass signals in the $F_2$ band.

Signals are applied to the input of discriminator 807 by limiter 812 whose output also extends to the input of carrier detector 818. Discriminator 807 functions to detect the frequency shift signals and develop, at the output thereof, D.-C. signals corresponding to the received marking or spacing signal. In the specific embodiment disclosed herein, the reception of a marking signal results in a ground potential and the reception of a spacing signal results in a negative potential at the output of discriminator 807. Carrier detector 818 functions to provide a negative potential when carrier is received and ground when the received carrier falls below a predetermined threshold.

The outputs of discriminator 807 and carrier detector 818 are separately applied to a logic circuit, generally indicated by block 819. Logic circuit 819 includes transfer switches 814 and 816 and transistor 815. Transistor 815, in turn, has positive battery applied to its base to normally render it nonconductive. The collector of transistor 815 has a negative potential applied thereto and, in addition, is connected to the input of timer 817.

In the initial condition, switch 814 extends the output of discriminator 807 to the emitter of transistor 815 while switch 816 connects the output of carrier detector 818 to the base of transistor 815. Accordingly, transistor 815 will be turned ON only in the event that the output of discriminator 807 is at ground and the output of carrier detector 818 is negative. This corresponds to the condition where a marking signal is received in the presence of carrier.

Assuming that a station attendant desires to call a remote station, the attendant operates the originating key n control and logic circuit 805. In response to the op- ›ration of the originating key, control and logic circuit ›05 operates transfer switch 808 and transfer switch 809, vhereby the output of modulator 806 is extended through ransfer switch 808 and the appropriate bandpass filter ›f filters 810 arranged to pass signals in the $F_1$ band, ransfer switch 809 and amplifier 811 to line circuit 802. Transfer switches 809 and 808 also connect line circuit ›02 to limiter 812 by way of amplifier 813, transfer witch 809, the appropriate filter in bandpass filters 810 o pass signals in the $F_2$ band, and transfer switch 808. Control and logic circuit 805 also arranges timer 817 to provide a 400 millisecond timing interval, renders discriminator 807 responsive to signals in the $F_2$ band and arranges modulator 806 to transmit signals in the $F_1$ band. In addition, control and logic circuit 805 arranges line circuit 802 to complete the signal paths from amplifiers 811 and 813 to the terminals of telephone line 801 and present an off-hook signal to the central office.

When dial tone is returned by the telephone office in response to the off-hook signal, the attendant dials the number of the desired remote station. The telephone switching office performs the conventional switching action to extend the telephone line to the called station in the same manner as an ordinary telephone call. The originating attendant may monitor the progress of the call with the listen-only handset provided in attendant's set 803.

When the call is answered by the remote station, a marking signal in the $F_2$ band is returned, as described hereinafter. This signal is received across telephone line 801 and is therefore passed to limiter 812. Limiter 812, in turn, applies the marking signal to discriminator 807 and carrier detector 818. Accordingly, discriminator 807 applies ground to the emitter of transistor 815 and carrier detector 818 applies a negative potential to the base. This turns transistor 815 ON and the resultant ground developed at the collector starts the operation of timer 817.

When the $F_2$ marking signal is received for 400 milliseconds, timer 817 times out and control and logic circuit 805, in response thereto, rearranges timer 817 to provide a 150 millisecond timing interval. Control and logic circuit 805 also operates switches 814 and 816. This provides a permanent ground to the emitter of transistor 815 and effectively transfers the output of discriminator 807 through switch 814 to the base of transistor 815. In addition, the output of carrier detector 818 is now extended by switch 816 to the input of timer 817. Thus, the reception of a spacing signal applies a negative potential to the base of transistor 815 providing ground to the collector and therefore to timer 817 and the loss of carrier results in ground at the output of carrier detector 818 providing ground to timer 817. Accordingly, timer 817 now monitors for a spacing signal or a loss of carrier.

Returning now to the time out of timer 817 in response to the marking signal, control and logic circuit 805 renders the printing apparatus of the teletypewriter 804 responsive to the output signals of discriminator 807 and renders modulator 806 responsive to the signaling contacts. In addition, control and logic circuit 805 enables modulator 806 and the signaling contacts of teletypewriter 804 in the idle marking condition, modulator 806 sends a marking signal in the $F_1$ band to telephone line 801.

The calling set is now in condition to send and receive message signals. Modulator 806 transmits signals in the $F_1$ band under control of the signaling contacts of teletypewriter 804, discriminator 807 is arranged to receive signals in the $F_2$ band and apply them to the printing apparatus of teletypewriter 804 and timer 817 is monitoring for spacing signals or a carrier failure.

At the answering station the ringing tone operates the ringer in attendant's set 803. The called station attendant answers the call by operating the answer key in control and logic circuit 805. Control and logic circuit 805, in turn, instructs line circuit 802 to provide an off-hook signal to the central office. In addition, timer 817 is activated by control and logic circuit 805 to time an interval to guarantee the propagation of the off-hook signal from the terminating central office to the originating central office. At the conclusion of this interval, timer 817 times out and control and logic circuit 805, in response thereto, arranges discriminator 807 to receive signals in the $F_1$ band and activates frequency shift modulator 806 to send a marking signal in the $F_2$ band. In addition, control and logic circuit 805 rearranges timer 817 to provide a 250 millisecond timing interval.

As previously described, the calling station responds to the $F_1$ marking signal by returning an $F_1$ marking signal. At the answering station, the reception of the marking signal turns transistor 815 ON, as previously described, whereby timer 817 times out after 250 milliseconds. Control and logic circuit 805, in response thereto, rearranges timer 817 to provide a 150 millisecond timing interval, operates switches 814 and 816 whereby timer 817 monitors for spacing signals or carrier failure, renders the printing apparatus of teletypewriter 804 responsive to discriminator 807 and places modulator 806 under control of the signaling contacts. Accordingly, the answering set is in condition to send and receive message signals.

Assuming now that one of the station operators desires to send a "break" signal, the "break" key of teletypewriter 804 is operated and a signal is thereby applied to control and logic circuit 805. Control and logic circuit 805, in response thereto, applies a spacing condition to the input of modulator 806 whereby a spacing signal is transmitted to telephone line 801. In addition, control and logic circuit 805 operates timer 817 and arranges timer 817 to time out after approximately 200 milliseconds.

When timer 817 times out, control and logic circuit 805 removes the spacing condition and modulator 806 reapplies a marking signal to telephone line 801. In addition, control and logic circuit 806 energizes the associated "break" lamp to indicate that the "break" signal has been transmitted. The "break" condition of the set is then terminated by the operation of the "break" release key in control and logic circuit 805 whereby the "break" lamp is de-energized and modulator 806 is again placed under control of the teletypewriter 804.

At the remote station the reception of the spacing "break" signal applies negative battery to the base of transistor 815, as previously described. Transistor 815, in turn, places operating ground on the input of timer 817. After about 150 milliseconds timer 817 times out and in response thereto control and logic circuit 805 energizes the associated "break" lamp and disables the transmitting contacts of teletypewriter 804 by maintaining a marking condition at the input of modulator 806. The attendant at the remote station removes the "break" condition by operating the "break" release key in control and logic circuit 805 which, in turn, de-energizes the "break" lamp and removes the marking condition applied at the input of modulator 806. The control of modulator 806 is thus returned to teletypewriter 804.

Assuming the station attendant desires to terminate transmission, the "clear" key associated with control and logic circuit 805 is operated. Control and logic circuit 805, in response thereto, disables teletypewriter 804 by maintaining a spacing condition upon the input of modulator 806 and blinds the input of teletypewriter 804 to incoming signals. In addition, control and logic circuit 805 operates the "clear" lamp associated therewith and arranges timer 817 to initiate its operation and time out after approximately 700 milliseconds.

When timer 817 times out, control and logic circuit 805 instructs line circuit 802 to restore telephone line 801 to the on-hook condition. In addition, modulator 806 is de-energized and both modulator 806 and discriminator 807 are restored to the initial condition prior to the origination of the call. Conrtol and logic circuit 805 also restores switches 814 and 816. If the station is a calling station, transfer switches 808 and 809 are also restored. Thus the station is disconnected from the telephone office and is returned to the initial idle condition prior to the origination of the call.

At the remote station the reception of the spacing "clear" signal results in the application of ground to the input of timer 817, as previously described. After approximately 150 milliseconds, timer 817 times out and control and logic circuit 805 energizes the "break" lamp and applies a marking condition to the input of modulator 806, as previously described. Since the "clear" signal interval has not terminated timer 817 times a second interval of approximately 350 milliseconds. At the termination of this second interval, control and logic circuit 805 blinds teletypewriter 804 to received signals and disables sending contacts of teletypewriter 804 by applying a spacing condition to the input of modulator 806. In addition, timer 817 is arranged to time a third interval of approximately 700 milliseconds.

At the termination of the 700 millisecond interval, timer 817 times out and control and logic circuit 805, in turn, instructs line circuit 802 to place telephone line 801 in the on-hook condition. It is noted at this time, however, that the data set has transmitted a 700 millisecond spacing signal corresponding to the "clear" interval. In addition, control and logic circuit 805 restores the data set to the initial idle condition in the same manner as the set which transmitted the initial "clear" signal.

If a carrier failure occurs during the message interval, carrier detector 818 applies ground to timer 817, as previously described. The data set thus responds to the carrier failure as though a "clear" signal was received. Accordingly, the data set restores to the idle condition. In addition, the data set sends a "clear" signal to the other set, as previously described, whereby the remote set is restored to the idle condition.

*Line circuit*

Referring now to FIG. 1, the telephone line loop which extends to the telephone office (not shown) is indicated by tip lead T and ring lead R. The contacts of relay 3–OH which are connected to lead T constitute the switch-hook contacts and, with relay 3–OH released, tip lead T extends through the break contacts of relay 3–OH, capacitor 102 and ringer 101 to the ring lead R.

The operation of relay 3–OH, as described hereinafter, functions to place the set in the off-hook condition. Under this condition, tip lead T extends through the make contacts of relay 3–OH, dial contacts 103 or capacitor 104 in shunt thereto, and across terminals 2 and 1 of hybrid coil 105 to ring lead R. Accordingly, with the data set in the off-hook condition, incoming signals across leads T and R are impressed across terminals 1 and 2 of hybrid coil 105. Conversely, outgoing signals impressed across terminals 1 and 2 of hybrid coil 105 are correspondingly passed through tip lead T and ring lead R of the telephone line. It is noted that with the set in the on-hook condition, ringer 101 is connected between the tip lead and the ring lead. Thus, incoming ringing signals operate ringer 101 to indicate an incoming call.

As previously described, with the set in the off-hook condition, dial contacts 103 are included in the path between the tip lead and the ring lead. This permits the data set subscriber to transmit dial pulses when a call is originated.

*Modulator*

Transistor 207, FIG. 2, is a keyer for modulator 205 and governs the frequency shift of modulator 205 between the marking and spacing signaling conditions. When teletypewriter signaling contacts 204 of teletypewriter 201 are in the marking or closed condition, a negative voltage is applied through contacts 204, the make contacts of normally-operated relay 3–RO or the make contacts of normally-operated relay 3–SO, in shunt thereto, and resistor 206 to the base of transistor 207, causing it to conduct. Similarly, when relay 3–CY is released, negative battery is applied through the make contacts of relay 3–RO or relay 3–SO, and resistor 206 to the base of transistor 207. Conversely, when teletypewriter signaling contacts 204 are open to transmit a spacing signal, and relay 3–CY is operated, the negative voltage is removed allowing positive potential to be applied through resistors 209 and 206 to the base of transistor 207, whereby transistor 207 is turned OFF.

When transistor 207 conducts, ground is applied by the emitter to the collector. Assuming relay 3–MO is released, ground on the collector of transistor 207 connects inductor 210 in parallel with inductor 212 and capacitor 211. Capacitor 211 and inductor 212, in turn, are connected to the base of transistor-oscillator 213 and constitute the tank circuit for the oscillator. Since, as described hereinafter, relay 3–MO, is released when the data set is in the terminating mode, capacitor 211 is connected to terminal 2 of inductor 212, reducing the amount of inductance across capacitor 211, resulting in a basic frequency in the higher or $F_2$ band. In addition, with inductor 210 shunting the tank circuit effectively reducing the tank circuit inductance, the oscillator oscillates at a higher frequency in the $F_2$ band, which frequency is chosen to represent the marking condition. Conversely, when the teletypewriter contacts 204 are in the open or spacing condition and transistor 207 is nonconductive, shunting inductor 210 is removed from the tank circuit, whereby the frequency is decreased in the $F_2$ band corresponding to the spacing frequency.

Assuming that the data set is in the originating condition, relay 3–MO is operated, as described hereinafter. This connects capacitor 211 to terminal 1 of inductor 212 increasing the amount of inductance across the capacitor, resulting in a basic frequency in the lower or $F_1$ frequency band. Accordingly, when a marking signal is being transmitted, the portion of inductor 210 between terminals 1 and 2 shunts the tank circuit and transistor-oscillator 213 oscillates at a higher frequency in the $F_1$ band, which is chosen to represent the marking frequency $F_{1M}$. Conversely, when a spacing condition is being transmitted and shunting inductor 210 is removed, the frequency is decreased to spacing frequency $F_{1S}$.

The collector of transistor 213 is connected by way of lead 215 to contacts of relay 3–OO as shown in FIG. 1. As described hereinafter, relay 3–OO is operated when the data set is in the terminating mode and released when the data set is in the originating mode. Accordingly, with the data set in the originating mode and transistor-oscillator 213 oscillating at a frequency within the $F_1$ frequency band, the signals are passed by way of the break contacts of relay 3–OO, $F_1$ filter 110, the break contacts of relay 3–OO, lead 112, and capacitor 113 to the base of transistor 114. Transistor 114 comprises buffer amplifier and functions to pass signals therethrough by way of its collector and capacitor 115 to terminal 3 of hybrid coil 105. Accordingly, the signal frequencies are applied across terminals 3 and 4 of hybrid coil 105 and are therefore impressed across terminals 1 and 2 whereby the signals are sent to the telephone line, as previously described.

Assuming that the data set is in the terminating mode, transistor 213 oscillates at a frequency in the $F_2$ frequency band and relay 3–OO is operated. These signals are thus applied through lead 215, the make contacts of relay 3–OO, $F_2$ filter 111, the make contacts of relay 3–OO, lead 112 and capacitor 113 to the base of transistor-amplifier 114. Accordingly, these signals are similarly applied by way of hybrid coil 105 to the telephone line.

*Demodulator*

As previously described, the frequency shift signals received from the telephone line are applied across terminals 1 and 2 of hybrid coil 105 and are thereby impressed across terminals 5 and 6. Terminal 6 of hybrid coil 105, in turn, is connected by way of capacitor 120 and resistor 121 to the base of transistor 122. Transistor 122 is a buffer amplifier wherein the base is biased slightly positive to ground by the connection of diode 123 to the junction of voltage divider resistors 124 and 125. Since the emitter of transistor 122 is connected to positive battery through resistor 119 which forms a voltage divider with resistors 118 and 121, diode 123 and resistors 124 and 125, the received frequency-shift signals appear on the collector of transistor 122. When normally-operated relay 3–CO is operated, the signals at the collector of transistor 122 are applied through resistor 126 to transformer 127. Transformer 127, in turn, passes the signals through amplifier 128 to listen-only handset, generally indicated by block 129.

The collector of transistor 122 is also connected to the contacts of relays 3–OO by way of resistor 131. Assuming now that the data set is in the originating mode, relay 3–OO is released and the incoming signals are applied through the break contacts of relay 3–OO, $F_2$ filter 111 and the break contacts of relay 3–OO to lead 132. Conversely, when the data set is in the terminating mode and relay 3–OO is operated, the signals applied through resistor 131 are passed through the make contacts of relay 3–OO, $F_1$ filter 110 and the make contacts of relay 3–OO to lead 132.

Figure 4:
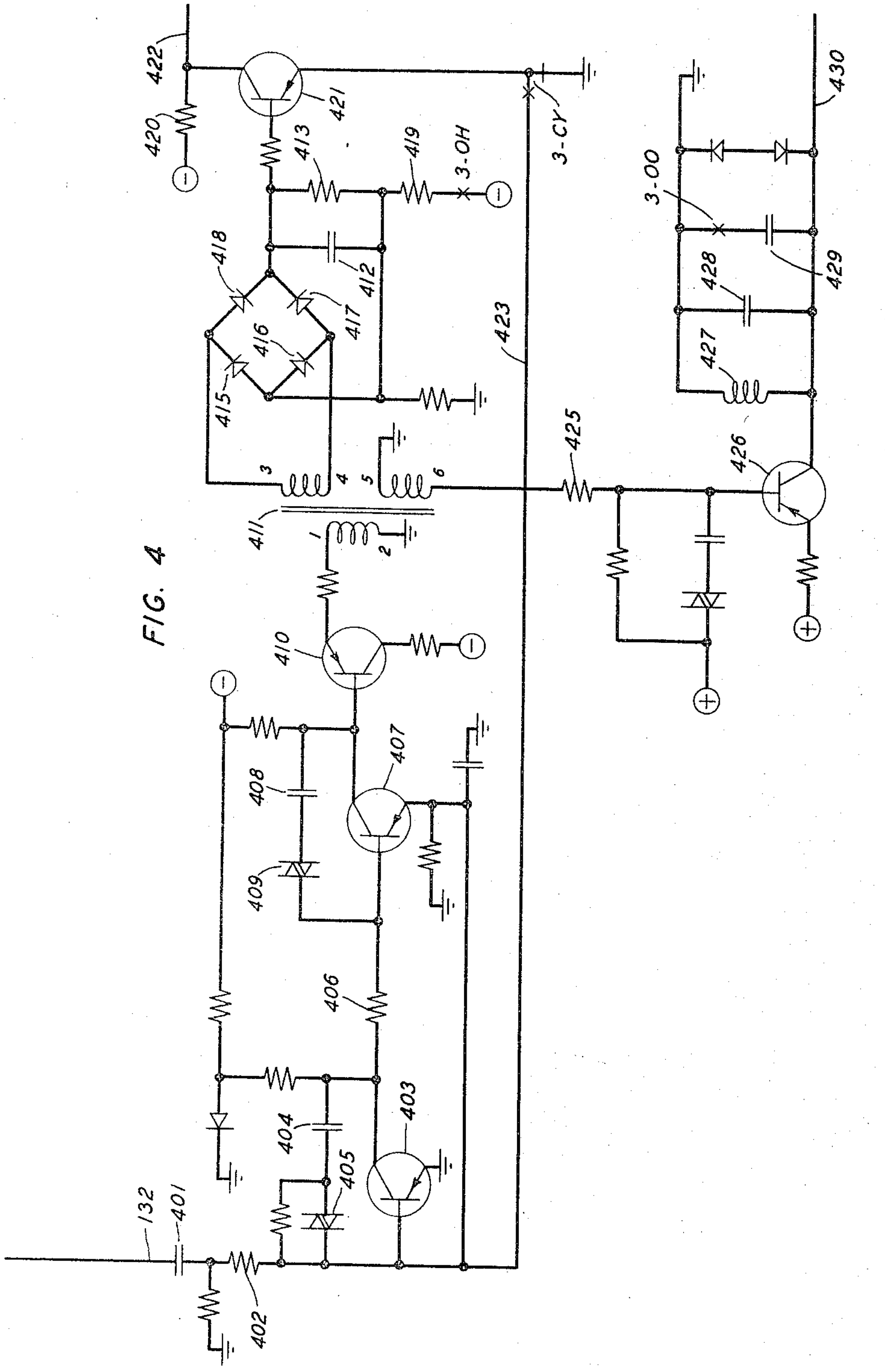

Lead 132 is connected through capacitor 401, FIG. 4, and resistor 402 to the base of limiter-transistor 403. Limiter-transistor 403, which comprises the first limiting stage, limits by virtue of the A.-C. feedback connection from the collector to the base through capacitor 404 and varistor 405. When the peak-to-peak output to the collector of transistor 403 exceeds the threshold of varistor 405, the varistor conducts, causing negative feedback to reduce the gain of the stage.

The output from the collector of transistor 403 is fed through resistor 406 to the base of transistor 407, which is the second limiter stage. The operation of transistor 407 is substantially identical to that of transistor 406. The feedback path of transistor 407 is shown comprising capacitor 408 and varistor 409. It is understood, of course, that two or more varistors may be provided in series to reduce the feedback and thereby provide less limiting as determined by the desired output level. Accordingly, the frequency shift signal provided at the output of transistor 407 is substantially uniform in amplitude and rectangular in form due to the limiting action of transistor stages 403 and 407.

The collector of transistor 407 is D.-C. coupled to the base of transistor 410. Transistor 410 is connected as an emitter-follower whereby the output provided at the emitter follows the signal output of the limiter stages. The emitter of transistor 410 is connected to terminal 1 of transformer 411. Accordingly, the limited signals are applied across terminals 1 and 2 of transformer 411.

Transformer 411 has a first secondary winding connected between terminals 3 and 4, and a second secondary winding connected between terminals 5 and 6. Terminals 3 and 4 are connected across a diode bridge detector comprising diodes 415, 416, 417 and 418. The diode bridge is thus excited in response to the reception of the A.-C. frequency-shift signals. The polling of the diodes is such that current from transformer 411 develops a positive voltage across load resistor 413. With relay 3–OH operated, however, a negative potential is applied through resistor 419 to oppose the positive voltage developed across resistor 413. Accordingly, the upper terminal of resistor 413, as shown in FIG. 4, is positive relative to ground when the signals detected by the bridge exceed a predetermined amplitude. Capacitor 412 is a smoothing capacitor to filter out the carrier ripple.

The signals developed by the detector are applied to the base of transistor 421. When relay 3–CY is released, the emitter of transistor 421 is connected to ground and the transistor is turned OFF when a received carrier signal renders the base positive. Conversely, the transistor is ON when no carrier is received and the base is negative. The collector or transistor 421 is connected to lead 422 and to negative battery via resistor 420. Accordingly, when no carrier is received, ground is applied by the emitter-to-collector path of transistor 421 to lead 422. When carrier is detected by the bridge, however, the emitter-to-collector path of transistor 421 is open and negative battery is applied to lead 422 by way of resistor 420. Lead 422 extends to the timing circuit, FIG. 6, whose operation is described hereinafter.

Assuming that relay 3–CY is operated, the emitter of transistor 421 is connected to ground via the make contacts of relay 3–CY, lead 423 and the base-to-emitter path of transistor 403. Thus, ground in response to no carrier and negative battery in response to carrier, is applied to lead 422 corresponding to the function provided when relay 3–CY is released. However, if the detected carrier is below the previously-described threshold, the current drawn by the emitter of transistor 421 via the emitter-to-base path of transistor 403 saturates the latter transistor. This renders transistor 403 unresponsive to incoming signals, blocking the operation of limiter stages 403 and 407 by maintaining the transistors conductive.

Terminal 6 of the second secondary winding of transformer 411 is connected by way of resistor 425 to the base of transistor-amplifier 426. The collector of transistor 426 is, in turn, connected to a bandpass filter consisting of inductor 427 and capacitor 428 when relay 3–OO is released and signals are received in the $F_2$ band. When the data set is in the terminating mode and receiving in the $F_1$ band, relay 3–OO is operated and capacitor 429 is connected in parallel to capacitor 428. Thus, the signals from the collector of transistor 426 are passed through the bandpass filter rejecting the high frequency components introduced by the limiter, for example, and therefore providing sinusoidal frequency shift signals to lead 403.

Figure 5:
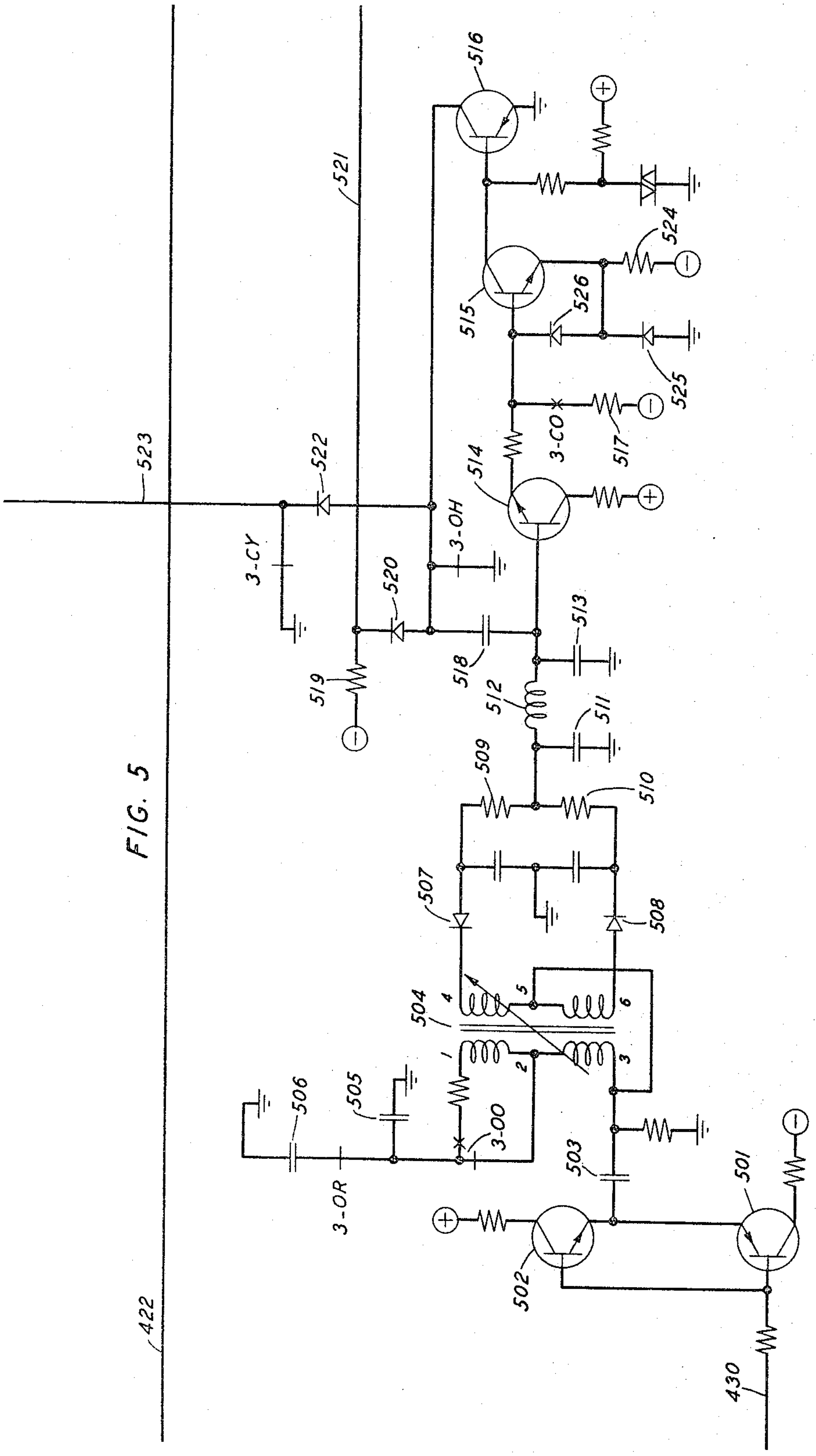

Lead 430 is connected in parallel to the base of transistors 501 and 502, FIG. 5. The collector-to-emitter path of transistor 502 is connected in series with the emitter-to-collector path of transistor 501 between positive battery and negative battery. Since the output of transistor 501 and transistor 502 is provided through capacitor 503 which is coupled to the emitters of the transistors, transistors 501 and 502 act as a pair of emitter-followers in parallel.

Capacitor 503 is connected to a series-resonant discriminator which includes coil 504 wherein terminal 3 of the primary winding of coil 504 is directly coupled to a tap on the secondary winding indicated by terminal 5. In addition, the secondary winding has no tuning element coupled thereto and is tightly coupled to the primary winding. When the data set is in the originating mode wherein relay 3–OR is operated and relay 3–OO is released, the connection of ground through capacitor 505 and the break contacts of relay 3–OO to terminal 2 of the primary winding series-tunes the circuit to a center frequency in the $F_2$ band. When the data set is in the terminating mode, the circuit is tuned to the $F_1$ band by the connection of terminal 1 of the primary winding through the make contacts of relay 3–OO to capacitor 505 and to capacitor 506, in shunt thereto, via the break contacts of relay 3–OR. The phase of the voltage supplied to terminal 5 is constant with frequency while the phase of the voltage induced across terminals 4 to 6 of the secondary winding varies with the instantaneous signal frequency. The sum and difference of these two voltage components are rectified by oppositely poled diodes 507 and 508 resulting in a net positive voltage in response to the marking signal and a net negative voltage in response to the spacing signal at the junction of load resistor 509 and load resistor 510.

The discriminator output is fed to a low pass filter consisting of inductor 512 and capacitors 511 and 513 to remove carrier ripple. The filter is connected to the base of transistor 514 which is arranged as an emitter-follower. The emitter of transistor 514 is connected, in turn, to the base of transistor 515.

The emitter of transistor 515 is connected to the junction of resistor 524 and diode 525 which are connected to negative battery and ground, respectively. This renders the emitter of transistor 515 slightly negative with respect to ground. The base of transistor 515 is connected to the emitter by way of diode 526 providing a back bias to render transistor 515 nonconductive. Thus transistor 515 is OFF when a negative spacing signal is applied to transistor 514 and is ON when a positive marking signal overcomes the back bias.

As described hereinafter, relay 3–CO is operated during the initial connect sequence. This provides an additional negative bias to the base of transistor 515 by way of resistor 517. Accordingly, during the connect sequence, a spacing bias is applied to transistor 515 to render the circuit unresponsive to noise impulses which would be recognized as connect signals.

The collector of transistor 515 is connected to the base of transistor slicer 516. When the operation of the data set is initiated, relay 3–OH operates to remove ground from the collector of transistor 516. This permits negative battery to be applied to the collector of transistor 516 via resistor 519 and diode 520. Thus the application of a positive marking signal to the base of transistor 514 turns ON transistor 515 which, in turn, turns ON transistor 516 to apply ground to the collector. Conversely, a negative spacing signal turns OFF transistor 516 to apply a negative potential to the collector. Capacitor 518, connected between the collector of transistor 516 and the base of transistor 514, provides regenerative feedback for insuring snap action of the slicer circuit.

The collector of transistor 516 is also connected by way of diode 522 and lead 523 to select magnet 202 of teletypewriter 201. In the initial condition, relay 3–CY is released and marking ground is applied to lead 523 through break contacts of relay 3–CY. After relay 3–CY is operated, the reception of a marking signal turns ON transistor 516 to apply marking ground to lead 523 via diode 522. Conversely, a spacing signal turns OFF transistor 516 placing lead 523 in the no-current spacing condition. Similarly, during the reception of a marking signal, ground from the collector of transistor 516 is applied to lead 521 through diode 520. When a spacing signal is received, removing the collector ground, negative battery is applied to lead 521 via resistor 519. Lead 521 extends to the timing circuit shown in FIG. 6.

*Timing circuit*

Figure 6:
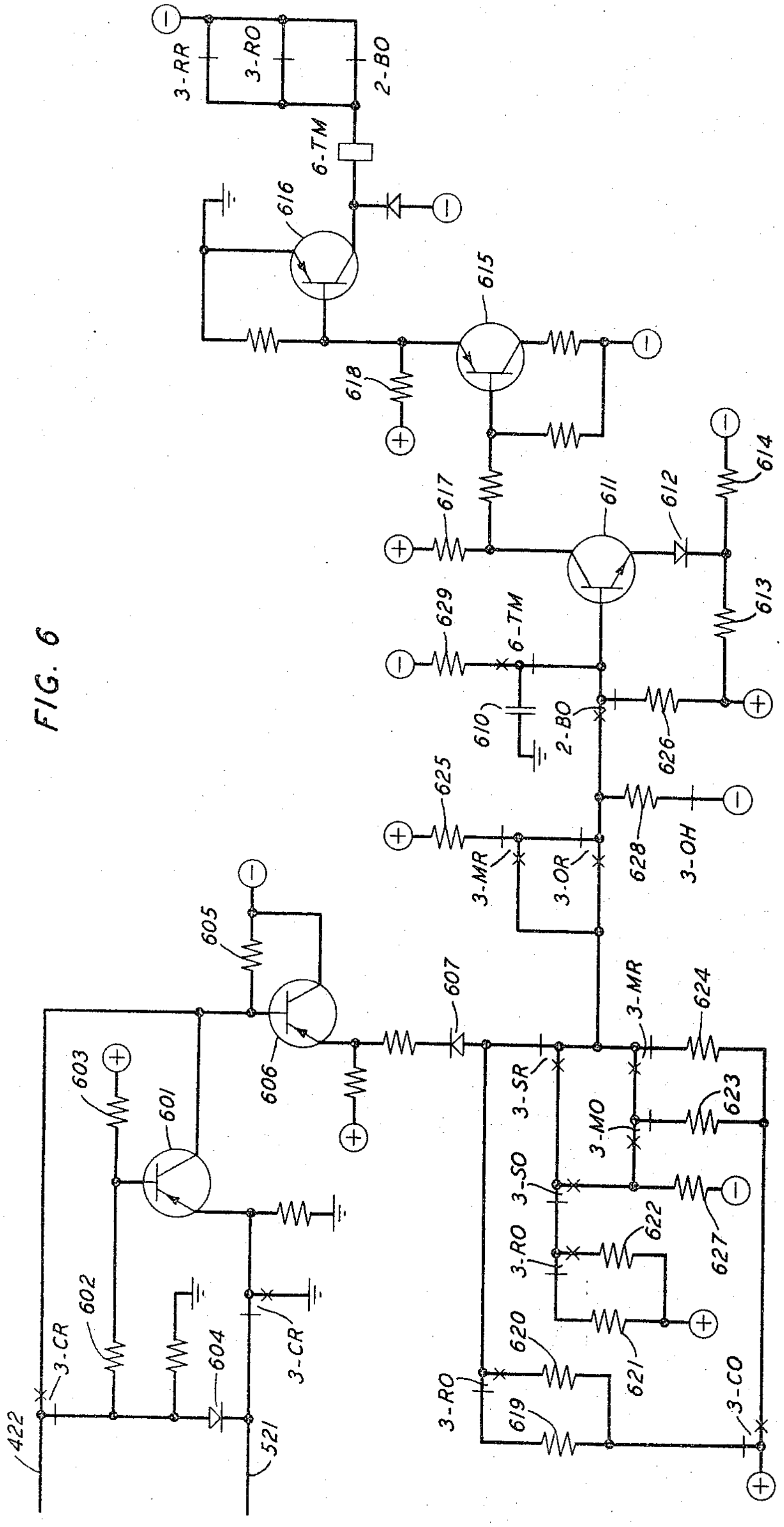

The timing circuit shown in FIG. 6 is provided, at the input thereof, with a logic circuit which includes transistor 601 and the contacts of relay 3–CR. Signals are applied to the logic circuit by way of leads 422 and 521. As previously described, lead 422 has ground applied thereto when there is a loss of the carrier signal and negative battery applied thereto by way of resistor 420, FIG. 4, when the carrier signal is received. Lead 521 has ground applied thereto when a marking signal is received and has negative battery applied thereto through resistor 519, FIG. 5, when a spacing signal is received.

In the initial condition relay 3–CR is released and lead 521 is connected through break contacts of relay 3–CR to the emitter of transistor 601. The base of transistor 601 is connected through resistor 602 and break contacts of relay 3–CR to lead 422. Positive battery is also connected to the base of transistor 601 through resistor 603 to back-bias the transistor. In accordance with this arrangement, transistor 601 can conduct only if ground is applied to lead 521 and negative battery is applied to lead 422. This situation only occurs when a marking signal is received in the presence of carrier.

As described hereinafter, relay 3–CR operates at the termination of the connect sequence. With relay 3–CR operated, ground is applied to the emitter of transistor 601 through the make contacts of relay 3–CR. Relay 3–CR also opens the previously-described path connecting lead 521 to the emitter of transistor 601. In addition, the path connecting lead 422 to the base of transistor 601 is opened by break contacts of relay 3–CR and lead 422 is connected to the base of transistor 606 by way of make contacts of relay 3–CR. Under this condition, with ground applied to the emitter of transistor 601, the transistor can conduct only in the event that negative battery is applied from lead 521 through diode 604 and resistor 602 to the base of transistor 601. Thus, transistor 601 is rendered conductive and ground is applied to the collector thereof when a spacing signal is received. In addition, ground is applied to the collector of transistor 601 by way of lead 422 in the event of a loss of carrier. Accordingly, under these conditions, the base of transistor 606 has ground applied thereto in the event that a spacing signal is received or there is a carrier failure.

Transistor 606 is normally rendered conductive by negative battery applied to the base by way of resistor 605. With transistor 606 conductive, the resultant negative potential developed at its emitter is applied through diode 607, which diode constitutes the input to the timing circuit. Diode 607, in turn, is connectable to timing capacitor 610 through the break contacts of relay 3–SR, the make contacts of relay 3–OR or the make contacts of relay 3–MR, and the break contacts of relay 3–OR in shunt thereto, the make contacts of relay 2–BO and the break contacts of relay 6–TM. The base of transistor 611 is also connected to timing capacitor 610 through the break contacts of relay 6–TM. Accordingly, it is noted that the right-hand plate of capacitor 610, as shown in FIG. 6, is charged negatively through diode 607 when transistor 606 is conducting. This applies a negative potential to the base of transistor 611, rendering it nonconductive. With the collector of transistor 611 connected to the base of transistor 615 and to positive battery by way of resistor 617, transistor 615 is correspondingly rendered nonconductive. Since the emitter of transistor 615 is connected to the base of transistor 616 and is also connected to positive battery by way of resistor 618, transistor 616 is also rendered nonconductive. With the collector of transistor 616 connected to relay 6–TM, relay 6–TM is maintained released when transistor 616 of OFF.

Assuming now that a timing function occurs, capacitor 610 will charge towards positive battery through one of several timing resistors, as described hereinafter. This drives the potential at the base of transistor 611 positive. The emitter of transistor 611 is connected through diode 612 to the junction of resistors 613 and 614. Resistors 613 and 614 are arranged as a voltage divider between positive battery and negative battery, whereby the emitter of transistor 611 has a potential applied thereto in accordance with the values of resistors 613 and 614. Accordingly, when the base of transistor 611 becomes more positive than the potential at the junction of resistors 613 and 614, transistor 611 is rendered conductive, reducing the collector potential. The reduced collector potential is applied to the base of transistor 615, rendering the latter transistor conductive. The reduces the potential at the emitter of transistor 615 whereby transistor 616 is rendered conductive. Ground is thus applied through the emitter-to-collector path of transistor 616 and relay coil 6–TM and contacts of relays 3–RR, 3–RO or relay 2–BO to negative battery, whereby relay 6–TM operates. Accordingly, the timing out of the timing circuit whose operation is described hereinafter renders transistors 611, 615, and 616 conductive and transistor 616, in turn, operates relay 6–TM.

*Originating station connect sequence*

When the data set is initially turned ON and power is applied thereto, relays 3–CO, 3–OO, 3–MO and 3–SO operate through obvious operating paths. In addition, with relay 2–BO released, the previously-described path connecting the base of transistor 611 to diode 607 is open. Capacitor 610 now charges to positive battery through resistor 626, the break contacts of relay 2–BO and the break contacts of relay 6–TM. After about 200 milliseconds the charge on timing capacitor 610 renders the base of transistor 611 more positive than the emitter, whereby transistor 611 turns ON. This, in turn, turns ON transistor 615 which turns ON transistor 616, as previously described. Accordingly, ground is applied through the emitter-to-collector path of transistor 616, the winding of relay 6–TM and the break contacts of relay 3–RR, for example, to negative battery, operating relay 6–TM.

With relay 6–TM operated, capacitor 610 is discharged to negative battery through the make contacts of relay 6–TM and resistor 629 thereby resetting timing capacitor 610. Relay 6–TM operated also completes a path from ground through the normally-closed contacts of "break" key 203 in teletypewriter 201, the winding of relay 2–BO and make contacts 6–TM to positive battery, operating relay 2–BO which locks to positive battery through its own make contacts. It is noted at this time that the make contacts of relay 3–CO extend ground to the winding of relay 2–BO shunting "break" contacts 203. With relay 2–BO operated the base of transistor 611 is extended through the make contacts of relay 2–BO, resistor 628 and the break contacts of relay 3–OH to negative battery whereby transistor 611 turns OFF. This, in turn, turns OFF transistors 615 and 616 thus releasing relay 6–TM. Capacitor 610 is now maintained discharged by the negative battery applied through resistor 628 and the break contacts of relay 6–TM.

To initiate a call the normally-open contacts 301, FIG. 3, of the originating key are closed, thereby completing a path from positive battery through the winding of relay 3—OR, originating key contacts 301, the break contacts of relay 3–OH and make contacts 3–SO or the break contacts of relay 6–TM to ground. The operation of relay 3–OR extends the ground on the winding thereof through the make contacts of relay 3—OR to the winding of relay 3–OH and relay 3–OH locks through its own make contacts and the ground provided by make contacts 3–SO or break contacts of relay 6–TM. At this time, relay 3–OR also locks to ground through its own make contacts and the previously-described locking path for relay 3–OH.

The operation of relay 3–OR opens the operating path for relay 3–OO and the latter relay releases. The release of relay 3–OO places the set in the originating mode, as previously described, by extending the input of the limiter through $F_2$ filter 111 to buffer amplifier 122 and extending the output of modulator 205 through $F_1$ filter 110 to buffer transistor amplifier 114. Relay 3–OO released also removes capacitor 429 from the bandpass filter at the output of amplifier 426, as previously described, and extends terminal 2 of coil 504 of the discriminator to capacitor 505. Since relay 3–OR is operated, removing capacitor 506 from the discriminator circuit, the demodulator is thus arranged to receive signals in the $F_2$ frequency band.

The operation of relay 3–OH extends the negative biasing voltage to the carrier detector through resistor 419, as previously described. In addition, relay 3–OH removes negative battery applied to the base of transistor 611 through resistor 628. At this time, with relay 3–OR operated, the base of transistor 611 is extended to diode 607 and since transistor 606 is normally conductive, negative potential applied through diode 607 maintains timing capacitor 610 discharged and transistor 611 OFF. Relay 3–OH operated also extends the tip and ring leads of the telephone line across terminals 1 and 2 of hybrid coil 105 and through dial contacts 103, as previously described. This provides an off-hook signal to the telephone central office which, in turn, returns the dial tone. The operator, monitoring the call progress tones with listen-only handset 129, now proceeds to dial the digits of the desired remote station whereby contacts 103 are periodically opened to send the D.-C. pulses to the telephone central office. The telephone central office responds to the dialed digits in the conventional manner, ringing the remote station if it is not busy. During the progress of the call, with relay 3–CO operated, the conventional telephone progress signals may be monitored by listen-only handset 129, as previously described.

As described hereinafter, the remote data set answers the call by going into the off-hook condition and returning a marking signal in the $F_2$ frequency band. This marking signal is received by the data set telephone line and applied across terminals 1 and 2 of hybrid coil 105. The marking signal is thus impressed across terminals 4 and 6 of hybrid coil 105 and thus passed through capacitor 120 to buffer amplifier 122. As previously described, the signal output provided at the collector of transistor 122 is passed through $F_2$ filter 111 to lead 132 which extends through capacitor 401 to the input of the limiter. The output signal of the limiter then is applied by transistor 410 across terminals 1 and 2 of transformer 411. Since a carrier signal is being received, the carrier detector bridge circuit applies a positive potential to the base of transistor 421. Accordingly, transistor 421 is rendered nonconductive and negative battery is applied to lead 422, which negative battery is extended to the base of transistor 601.

Returning now to the signals applied across terminals 1 and 2 of transformer 411, the signals thereby impressed across terminals 5 and 6 are passed to transistor-amplifier 426 and then by way of lead 430 to the discriminator. Since, as previously described, the discriminator is now arranged to detect signals in the $F_2$ frequency band, the marking signal provides a positive potential at the junction of load resistors 509 and 510. This marking signal is passed through the low pass filter to the base of transistor 514. Transistor 514 is turned ON, turning ON, in turn, transistor 515 and 516, whereby ground is applied to the collector of transistor 516 and passed through diode 520 and lead 521 to the emitter of transistor 601.

With ground on the emitter of transistor 601 and negative battery applied to the base thereof, transistor 601 is rendered conductive thus applying ground to the base of transistor 606. The application of ground to the base of transistor 606 raises the potential of the emitter, whereby the negative potential previously applied to diode 607 is removed. The removal of this negative potential now permits timing capacitor 610 to charge to positive battery by way of the break contacts of relay 6–TM, the make contacts of relay 2–BO, the make contacts of relay 3–OR, the break contacts of relay 3–MR, resistor 624, and the make contacts of relay 3–CO. The constants of capacitor 610 and resistor 624 are such that the positive change on capacitor 610 exceeds the positive potential applied to the emitter of transistor 611 after approximately 400 milliseconds. Accordingly, when the marking signal in the $F_2$ frequency band is received for a duration exceeding 400 milliseconds, transistor 611 turns ON, turning ON, in turn, transistors 615 and 616. This extends ground through the winding of relay 6–TM and break contacts of relay 3–RR to negative battery, operating relay 6–TM.

Relay 6–TM operated discharges capacitor 610 through resistor 629, as previously described. In addition, relay 6–TM operated completes an operating path for relay 3–CR which may be traced from negative battery through make contacts of relay 3–OH, the winding of relay 3–CR, the break contacts of relay 3–CR, the make contacts of relay 3–OR and the make contacts of relay 6–TM to ground and relay 3–CR locks to ground through its own make contacts. Relay 3–CR operated reverses the connection to the input of transistor 601, as previously described, whereby transistor 606 is rendered nonconductive when a spacing signal is received or when the carrier signal is lost. Accordingly, negative battery is reapplied through diode 607 to the base of transistor 611 whereby transistors 611, 615 and 616 are turned OFF. This, in turn, releases relay 6–TM. In addition, relay 3–CR operated completes an operating path for relay 3–CY through the break contacts of relay 3–SR and the make contacts of relay 3–CR. Relay 3–CY operated removes the shunt around teletypewriter signaling contacts 204 and removes disabling ground from lead 523 which extends to select magnet 202, as previously described. Accordingly, the transmission from and reception by teletypewriter 201 is enabled.

The operation of relay 3–CR also extends a holding ground for relay 3–CO through the make contacts of relay 3–CR, the make contacts of relay 3–CO, the make contacts of relay 3–OR and the make contacts of relay 6–TM. The subsequent release of relay 6–TM, however, removes this holding ground whereby relay 3–CO releases. The release of relay 3–CO now applies negative battery to the collector of transistor oscillator 213 through resistor 214, the break contacts of relay 3–CO and the make contacts of relay 3–MO. Since relay 3–MO is operated, the modulator is now enabled to transmit in the $F_1$ frequency band. With teletypewriter signaling contacts 204 in the marking condition, negative battery is applied through the make contacts of relay 3–RO or the make contacts of relay 3–SO in shunt thereto and resistor 206 to the base of transistor 207. Accordingly, transistor 207 is rendered conductive whereby, as previously described, the marking signal in the $F_1$ frequency band is transmitted. Relay 3–CO released also applies disabling ground to transformer 127, whereby listen-only handset 129 is disabled.

With the teletypewriter now enabled, the modulator arranged to transmit in the $F_1$ frequency band and the discriminator arranged to receive in the $F_2$ frequency band, the connect sequence is completed and the subset may now transmit and receive message signals. In addition, the operation of relay 3–CO opens the previously-described charging path for timer capacitor 610 through resistor 624 and extends a new charging path for capacitor 610 through the break contacts of relay 6–TM, the make contacts of relay 2–BO, the make contacts of relay 3–OR, the break contacts of relay 3–SR, the make contacts of relay 3–RO, resistor 620 and the break contacts of relay 3–CO, whereby the timer is arranged to look for break signals, as described hereinafter.

*Terminating station connect sequence*

At the answering station when the call is received the ringing signal across the telephone line is applied through the break contacts of relay 3–OH, capacitor 102 and ringer 101. The subset operator, in response to the audible ring provided by ringer 101, operates the answer key to close contact 302. This extends the ground through the break contacts of relay 6–TM or the make contacts of relay 3–SO in shunt thereto to the winding of relay 3–OH by way of contacts 302 and the break contacts of relay 3–OR and relay 3–OH locks through its own make contacts around the break contacts of relay 3–OR and contacts 302.

The operation of relay 3–OH places the subset in the off-hook condition by connecting the telephone line across terminals 1 and 2 of hybrid coil 105, as previously described. In addition, relay 3–OH operated removes the negative battery applied through resistor 628 to timing capacitor 610. Accordingly, capacitor 610 charges through the break contacts of relay 6–TM, the make contacts of normally-operated relay 2–BO, the break contacts of relay 3–OR, the break contacts of relay 3–MR and resistor 625 to positive battery. When the positive charge on capacitor 610 exceeds the potential on the emitter of transistor 611, the transistor is rendered conductive, turning ON, in turn, transistors 615 and 616. This applies ground through the winding of relay 6–TM and the break contacts of relay 3–RR to negative battery, operating relay 6–TM. Relay 6–TM resets timing capacitor 610, as previously described. In addition, the operation of relay 6–TM completes an operating path for relay 3–MR which may be traced from negative battery through the make contacts of relay 3–OH, the winding of relay 3–MR, the break contacts of relay 3–MR, the break contacts of relay 3–OR and the make contacts of relay 6–TM to ground, operating relay 3–MR which locks to ground through its own make contacts. With relay 3–MR operated, a holding ground is applied to the winding of relay 3–MO through the make contacts of relay 3–MR, the make contacts of relay 3–MO, the break contacts of relay 3–OR and the make contacts of relay 6–TM.

Relay 3–MR operated opens the previously-described charging path for timing capacitor 610 through resistor 625 and extends timing capacitor 610 through the break contacts of relay 6–TM, the make contacts of normally-operated relay 2–BO, the break contacts of relay 3–OR, the make contacts of relay 3–MR and the break contacts of relay 3–SR to diode 607. However, since no carrier is being received, transistor 606 is rendered nonconductive, precluding the application of a negative potential through diode 607 to the base of transistor 611. With relay 3–MR operated, capacitor 610 is now discharged to negative battery through resistor 627, the make contacts of relay 3–MO, the make contacts of relay 3–MR and then by way of the previously-traced path through the contacts of relays 3–MR, 3–OR, 2–BO and 6–TM. This turns OFF transistor 611, turning OFF, in turn, transistors 615 and 616, whereby relay 6–TM releases.

The release of relay 6–TM opens the previously-described holding path for relay 3–MO and the latter relay releases. With relay 3–MO released, negative battery is applied to the collector of transistor-oscillator 213 by way of the break contacts of relay 3–MO and resistor 214. With relay 3–MO released and teletypewriter signaling contacts 204 in the marking condition, modulator 205 transmits the marking signal in the $F_2$ frequency band, as previously described. Since relay 3–OO is normally operated, this signal is applied to buffer amplifier 114 through $F_2$ filter 111, as previously described. Accordingly, the answering subset, in response to the call, returns a marking signal in the $F_2$ frequency band to the originating station. In addition, incoming signals received by buffer amplifier 122 are passed through $F_1$ filter 110, as previously described, to the limiter. In the discriminator, since relay 3–OO is operated and relay 3–OR is released, the series connection of the primary winding of coil 504 and capacitor 505, together with shunting capacitor 506, arranges the circuit to receive signals in the $F_1$ frequency band.

As previously described, when the originating station receives a marking signal in the $F_2$ frequency band, it sends back a marking signal in the $F_1$ frequency band. At the answering station the marking signal is received and passed through $F_1$ filter 110 and the limiter to the carrier detector and the discriminator. The carrier detector responds to the carrier signal by applying a negative potential to lead 422. The discriminator, upon detecting a marking signal, applies ground to lead 521, as previously described. Since relay 3–CR is released, transistor 601 is rendered conductive, applying ground to the base of transistor 606.

With the removal of the negative potential from diode 607, capacitor 610 proceeds to charge by way of the contacts of relays 6–TM, 2–BO, 3–MR and then through the make contacts of relay 3–MR, the break contacts of relay 3–MO resistor 623 and the make contacts of relay 3–CO to positive battery. After approximately 250 milliseconds the charge on capacitor 610 exceeds the potential applied to the emitter of transistor 611 whereby transistor 611 is rendered conductive turning ON, in turn, transistors 615 and 616. Accordingly, ground is applied through the winding of relay 6–TM and the break contacts of relay 6–RR to negative battery, operating relay 6–TM. Relay 6–TM operated completes an operating path for relay 3–CR through the make contacts of relay 3–OH, the winding of relay 3–CR, the break contacts of relay 3–CR, the break contacts of relay 3–MO, the break contacts of relay 3–OR and the make contacts of relay 6–TM to ground, operating relay 3–CR which locks to ground through its own make contacts. With relay 3–CR operating, a holding path for relay 3–CO is completed through the make contacts of relay 3–CR, the make contacts of relay 3–CO, the break contacts of relay 3–MO, the break contacts of relay 3–OR and the make contacts of relay 6–TM.

Relay 3–CR operated transfers the inputs to the timing circuit whereby the timer monitors for the space or carrier fail signals, as previously described. This restores transistor 606 to the normally-conductive condition whereby the negative potential at the emitter of the transistor is applied to transistor 611. Transistor 611 is thus rendered nonconductive, turning OFF transistors 615 and 616, which, in turn, release relay 6–TM. Relay 6–TM released opens the previously-described holding path for relay 3–CO, releasing the latter relay.

Returning now to relay 3–CR operated, the previously-described operating path for relay 3–CY is completed. With relay 3–CY operated, disabling ground is removed from select magnet 202 and shunting battery is removed from around teletypewriter signaling contacts 204. Accordingly, the answering subset is enabled to transmit signals in the $F_2$ frequency band and receive signals in the $F_1$ frequency band. In addition, the timer is now arranged to monitor for the spacing "break" signals. Accordingly, the two subsets can now transmit the message signals to each other.

The answering subset is arranged to return to the on-hook condition in the event that a call is received from a station other than a data subset. This may occur, for example, when a telephone subscriber dials the wrong number and thereby reaches the data set.

It is recalled that after the answering key is operated and the timer times out to operate relay 6–TM which, in turn, operates relay 3–MR, the data set sends the marking signal and then awaits the marking signal response of the calling set. Upon the operation of relay 3–MR, with relay 3–CO operated, negative battery which is applied to the base of transistor 305, FIG. 3, by way of the break contacts of relay 3–MR or the break contacts of relay 3–CO is removed. Accordingly, the upper plate of capacitor 304, as shown in FIG. 3, proceeds to charge to positive battery by way of resistor 303. Assuming that a marking signal is not received within approximately 6 seconds and relay 3–CO does not, in consequence, release to reapply negative battery to the base of transistor 305, the upper plate of capacitor 304 charges sufficiently to turn transistor 305 ON. This removes the positive battery applied to the collector of transistor 305 by way of resistor 306 by applying ground thereto through the collector-to-emitter path of transistor 305. The consequent negative-going voltage to the collector of transistor 305 is thus applied to the base of transistor 307, turning the latter transistor ON. With transistor 307 conducting, a path is completed from ground through the emitter-to-collector path of transintor 307, the winding of relay 3–SR, the make contacts of relay 3–OH, and the make contacts of relay 2–BO to negative battery, operating relay 3–SR which locks to ground through its own make contacts. With relay 3–SR operating, the operating path for relay 3–SO is open and the latter relay releases. In addition, an energizing path for "clear" lamp 312 is completed via the make contacts of relays 3–SR and 3–OH.

Relay 3–SR operated also completes a charging path for timing capacitor 610 through the break contacts of relay 6–TM, the make contacts of relay 2–BO, the break contacts of relay 3–OR, the make contacts of relay 3–MR, the make contacts of relay 3–SR, the break contacts of relay 3–SO, the make contacts of relay 3–RO, and resistor 622 to positive battery. Capacitor 610 rapidly charges to turn ON transistor 611 which, in turn, turns ON transistors 615 and 616 and transistor 616 completes the previously-described operating path for relay 6–TM. Relay 6–TM operated together with relay 3–SO released, opens the previously-described locking path for relay 3–OH. With relay 3–OH released, the previously-described locking path for relays 3–MR and 3–SR are opened, and these relays release. The release of relay 3–SR reoperates relay 3–SO and the release of relay 3–MR reoperates relay 3–MO. Returning now to relay 3–OH released, negative battery is reapplied to the base of transistor 611 through resistor 628 turning OFF transistor 611, whereby relay 6–TM releases. In addition, relay 6–OH released restores the subset to the on-hook condition. Accordingly, the subset is returned to the initial idle condition prior to the answering of the call.

*Sending and receiving "break" signals*

As previously described, the data sets, at the conclusion of the connect sequence, are arranged to transmit and receive marking and spacing signals in the appropriate frequency bands. In addition, the timing circuits are monitoring for spacing "break" signals.

Assuming now that at one of the stations the operator depresses the "break" key thereby opening contacts 203 of teletypewriter 201. This opens the previously-described operating and locking paths for relay 2–BO and the relay releases. The release of relay 2–BO disconnects the base of transistor 611 from diode 607 and extends positive battery to the base of transistor 611 through resistor 626 and the break contacts of relay 2–BO. In addition, relay 2–BO released provides positive battery to the base of modulator keyer transistor 207 through the break contacts of relay 6–TM, the break contacts of relay 2–BO and resistor 208. This turns OFF transistor 207, whereby inductor 210 is removed from the tank circuit. Accordingly, transistor-oscillator 213 generates a spacing signal in the appropriate frequency band.

After about 200 milliseconds timing capacitor 610 charges sufficiently to turn ON transistor 611, turning ON, in turn, transistors 615 and 616 whereby the operating path of relay 6–TM is completed through the break contacts of relay 3–RR. Relay 6–TM operated completes an operating path for relay 3–RR through the make contacts of relay 6–TM, the make contacts of relay 3–OH, the winding of relay 3–RR, the break contacts of relay 3–RR, the break contacts of relay 3–CO, the make contacts of relay 3–OR, if the "break" signal is sent by the originating station, or in the break contacts of relay 3–MO and the break contacts of relay 3–OR, if the "break" signal is sent from the terminating station, and the make contacts of relay 6–TM to ground, operating relay 3–RR which locks to ground through its own make contacts and the normally-closed contacts 309 of the "break" release key.

With relay 6–TM operated the path applying positive battery to the base of transistor 207 through the break contacts of relay 6–TM is open and negative battery is reapplied to the base of transistor 207 through the make contacts of relay 3–RR, the make contacts of relay 3–SO and resistor 206. This turns transistor 207 back ON whereby a marking signal is transmitted so long as relay 3–RR remains operated to apply the negative battery to the base of transistor 207.

Relay 3–RR operated completes an energizing path for "break" lamp 311 through the make contacts of relays 3–RR and 3–SO to indicate to the operator that the "break" signal has been transmitted. With relay 3–RR operated, a holding path is now completed for relay 3–RO through the make contacts of relay 3–RR, and the make contacts of relay 3–RO to ground by way of the portion of the previously-described operating path for relay 3–RR which includes the contacts of relays 3–CO, 3–OR and 6–TM.

After the "break" key has been released, reapplying ground to the winding of relay 2–BO and relay 6–TM operates extending battery to the winding of relay 2–BO, the latter relay reoperates. With relays 2–BO, 3–RO and 3–RR operated, the operating path of relay 6–TM is open, releasing the relay. This opens the previously-described holding path for relay 3–RO and the latter relay releases.

The circuit is now restored to the normal message transmission condition by the operation of "break" release key 309. This opens the previously-described locking path for relay 3–RR. The release of relay 3–RR re-establishes the operating path for relay 3–RO. With relay 3–RO reoperated the subset is in condition to recontinue message transmission.

At the remote data set the reception of the spacing "break" signal turns OFF transistor 606, as previously described. The negative potential applied to the base of transistor 611 through diode 607 is thus removed and timing capacitor 610 proceeds to charge through resistor 620, as previously described. After about 150 milliseconds, the charge on timing capacitor 610 is sufficient to turn ON transistor 611, whereby relay 6–TM operates through the break contacts of relay 3–RR. The operation of relay 6–TM completes the previously-described operating path for relay 3–RR. Relay 3–RR operated establishes the previously-described holding path for relay 3–RO and releases relay 6–TM. In addition, relay 3–RR completes the previously-described energizing path for "break" lamp 311, indicating the reception of the "break" signal. With relay 6–TM released, relay 3–RO releases in the same manner as previously described.

Since, at the remote station which sent the "break" signal, a mark signal is transmitted immediately thereafter, transistor 606 again is rendered conductive and a negative potential is reapplied through diode 607 to the base of transistor 611. The operator at the station now removes the "break" condition by operating "break" release key 309 whereby relay 3–RR is released, reoperating, in turn, relay 3–RO.

*Clearing sequence*

Either data set may terminate the message by sending a "clearing" signal. This "clearing" signal constitutes a spacing signal approximately 700 milliseconds in length. The operator initiates the clearing sequence by operating "clear" key 310, providing a path from ground through "clear" key contacts 310, the make contacts of relay 3–RO, the winding of relay 3–RR, the make contacts of relay 3–OH and the make contacts of relay 2–BO to negative battery and relay 3–RR operates through its own make contacts and the normally-closed contacts of "break" release key 309. Relay 3–RR operated opens the operating path for relay 3–RO and the latter relay releases. In addition, the previously-described energizing path for "break" lamp 311 is completed. The release of relay 3–RO completes an operating path for relay 3–SR which may be traced from negative battery through the make contacts of relay 2–BO, the make contacts of relay 3–OH, the winding of relay 3–SR, the break contacts of relay 3–RO and "clear" key 310 to ground, operating relay 3–SR which locks to ground through its own make contacts.

Relay 3–SR operated opens the previously-described path connecting diode 607 to the base of transistor 611 and extends the base of transistor 611 to the contacts of relay 3–SO. Relay 3–SR operated also opens the operating path for relay 3–SO and the latter relay releases. In addition, relay 3–SR operated opens the previously-described energizing path for relay 3–CY and this relay releases. With relay 3–CY released, the previously-described blinding ground is applied to select magnet 202 and shunting battery is applied around signaling contacts 204 whereby teletypewriter 201 is disabled. In addition, relay 3–SR operated completes the energizing path for "clear" lamp 312 through the make contacts of relay 3–SR and the make contacts of relay 3–OH. With relay 3–SR released, the energizing path for "break" lamp 311 is open, de-energizing this lamp. The energization of "clear" lamp 312 indicates the transmission of the clearing signal.

The release of relay 3–SO with relay 3–RO released opens the previously-described path extending from the base of transistor 207 to signaling contacts 204. Accordingly, positive battery applied through resistors 209 and 206 turns OFF transistor 207 whereby a spacing signal is transmitted. In addition, with relay 3–SR operated and relays 3–SO and 3–RO released, timing capacitor 610 charges to positive battery through resistor 621, the break contacts of relay 3–RO, the break contacts of relay 3–SO, the make contacts of relay 3–SR, the make contacts of relay 3–OR if the clearing sequence is sent from the originating station, or the make contacts of relay 3–MR and the break contacts of relay 3–OR in shunt thereto, if the clearing signal is transmitted from the terminating station, the make contacts of relay 2–BO and the break contacts of relay 6–TM. After 700 milliseconds, timing capacitor 610 charges sufficiently to turn ON transistor 611, whereby relay 6–TM operates through the break contacts of relay 3–RO.

The operation of relay 6–TM together with the release of relay 3–SO opens the previously-described holding path for relay 3–OH and this relay releases. In addition, if the clearing signal is sent from the originating station, relay 6–TM operated opens the previously-described holding path for relay 3–OR and relay 3–OR, in turn, reoperates relay 3–OO.

The release of relay 3–OH reapplies negative battery to the base of transistor 611 through resistor 628 and the make contacts of relay 2–BO. Transistor 611 thus is turned OFF and relay 6–TM releases. In addition, the release of relay 3–OH opens the previously-described locking path for relay 3–RR and relay 3–RR, in turn, reoperates relay 3–RO. Relay 3–OH released also opens the locking path for relay 3–SR and relay 3–SR, in turn, reoperates relay 3–SO. Relay 3–OH released also opens the energizing path for "clear" lamp 312 and restores the data set to the on-hook condition, as previously described. In addition, the release of relay 3–OH opens the previously-described locking path for relay 3–CR and relay 3–CR, in turn, reoperates relay 3–CO. If the clearing signal is transmitted from the terminating station, the release of relay 3–OH opens the previously-described locking path for relay 3–MR and relay 3–MR, in turn, reoperates relay 3–MO. At this point the data set is restored to the initial condition prior to the origination of the call.

At the remote station, when the spacing "clear" signal is received, transistor 601 turns ON to remove the application of negative battery through diode 607. Since the data set is monitoring for a spacing "break" signal, timing capacitor 610 charges through resistor 620, as previously described. After approximately 150 milliseconds, transistor 611 is thus turned ON to operate relay 6–TM through the break contacts of relay 3–RR. This completes the previously-described operating path for relay 3–RR whereby "break" lamp 311 is energized and relay 6–TM is released, as previously described.

The release of relay 6–TM releases relay 3–RO in the same manner as previously described relative to the reception of a "break" signal. Since a "clear" signal is being received, transistor 606 is still precluding the application of negative battery to diode 607 upon the release of relay 3–RO.

Accordingly, timing capacitor 610 again starts to charge to positive battery, but with relay 3–RO released, this charging path is traced through the break contacts of relay 3–CO, resistor 619, the break contacts of relay 3–RO, the break contacts of relay 3–SR, the make contacts of relay 3–OR, if the station is an originating station, or the make contacts of relay 3–MR and the break contacts of relay 3–OR in shunt thereto, if the station is a terminating station, the make contacts of relay 2–BO and the break contacts of relay 6–TM. After about 350 milliseconds timing capacitor 610 charges sufficiently to render transistor 611 conductive, whereby relay 6–TM operates through the break contacts of relay 3–RO.

With relay 6–TM operated, an operating path is completed for relay 3–SR which path can be traced from negative battery through the make contacts of relay 6–TM, the make contacts of relay 3–OH, the winding of relay 3–SR, the break contacts of relay 3–SR, the break contacts of relay 3–RO, the break contacts of relay 3–CO, the make contacts of relay 3–OR, if the station is an originating station, or the break contacts of relay 3–MO and the break contacts of relay 3–OR, if the station is a terminating station, and the make contacts of relay 6–TM to ground operating relay 3–SR which locks to ground through its own make contacts.

The operation of relay 3–SR completes a holding path for relay 3–SO through the make contacts of relay 3–SR and the make contacts of relay 3–SO to ground by way of the previously-traced operating path of relay 3–SR, which includes the contacts of relays 3–CO, 3–OR and 6–TM. Relay 3–SR operated releases relay 3–CY, as previously described, whereby teletypewriter 201 is blinded. In addition, relay 3–SR operated energizes "clear" lamp 312, as previously described, to indicate to the operator the reception of a clearing signal. With relay 3–SR operated, negative battery is applied to the base of transistor 611 through resistor 627, the make contacts of relay 3–SO, the make contacts of relay 3–SR and the previously-described path through the contacts of relays 3–SR and 2–BO to the base of transistor 611. This turn OFF transistor 611 which, in turn, releases relay 6–TM. The release of relay 6–TM opens the previously-described holding path for relay 3–SO and the latter relay releases.

The release of relay 3–SO, with relay 3–RO released, disconnects the path extending the base of transistor 207 to signaling contacts 204. Accordingly, as previously described, positive battery is applied through resistors 209 and 206 to the base of transistor 207 whereby a spacing signal is returned to the station which originated the clearing signal. Relay 3–SO released also provides a charging path for timing capacitor 610 through resistor 621, as previously described. Accordingly, after about 700 milliseconds, relay 6–TM is reoperated and with relay 3–SO released relay 3–OH is released. Also, as previously described, relay 3–OR releases, reoperating, in turn, relay 3–OO. With relay 3–OH released, relays 3–RR, 3–SR and 3–CR release, as previously described, thus reoperating relays 3–RO, 3–SO and 3–CO. In addition, as previously described, the release of relay 3–OH releases relay 6–TM and restores the data set to the on-hook condition. If the data set is a terminating station, relay 3–OH released opens the previously-described locking path for relay 3–MR and relay 3–MR, in turn, reoperates relay 3–MO.

This sequence of operation concludes the clearing sequence. At the conclusion of this clearing sequence, the data sets are both restored to the on-hook condition and are thus disconnected by the telephone office. In addition, both data sets are restored to the previously-described idle condition prior to the origination of a call.

Although a specific embodiment of this invention has been shown and described, it will be understood that various modifications may be made without departing from the spirit of this invention and within the scope of the appended claims.

What is claimed is:

1. In a data transmission system, a first signal receiver, a second signal receiver, a signal gate jointly responsive to said first receiver and to said second receiver, a timing circuit responsive to said signal gate, and means responsive to said timing circuit for rendering said signal gate solely responsive to said first receiver and rendering said timing circuit directly responsive to said second receiver.

2. In a data transmission system, a first signal receiver, a second signal receiver, a signal gate, timing means responsive to said signal gate, first means for rendering said signal gate responsive to said second receiver, second means responsive to said first receiver for disabling said signal gate, first switch means for disabling said first means and rendering said timing means directly responsive to said second receiver, second switch means for disabling said second means and rendering said signal gate responsive to said first receiver, and means responsive to said timing means for operating said first switch means and said second switch means.

3. In a data transmission system, a first receiver for generating first and second condition signals, a second receiver for generating first and second condition signals, a signal gate responsive to said second receiver first condition signals in the absence of said first receiver first condition signals, timing means responsive to said signal gate, and means responsive to said timing means for rendering said signal gate solely responsive to said first receiver first condition signals and rendering said timing means directly responsive to said second receiver second condition signals.

4. In a receiver for frequency shift data signals, a discriminator for generating first and second condition signals in accordance with the frequency of said data signals, a detector for generating first and second condition signals in accordance with the level of said data signals, a signal gate responsive to said detector first condition signals in the absence of said discriminator first condition signals, timing means responsive to said signal gate and means responsive to said timing means for rendering said signal gate solely responsive to said discriminator first condition signals and rendering said timing means directly responsive to said detector second condition signals.

5. In a receiver for data signals, a transistor including an emitter, a base and a collector, timing means having the input thereof connected to said collector, a first signal receiver having the output thereof connected to said emitter, a second signal receiver having the output thereof connected to said base, first switch means for effectively transferring the output of said first signal receiver to said base, second switch means for effectively transferring the output of said second signal receiver to said timing means input, and means responsive to said timing means for operating said switch means.

6. In a receiver for data signals, a transistor including an emitter, a base and a collector, bias means connected to said base for normally disabling said transistor, timing means having the input thereof connected to said collector, a discriminator for generating first and second condition signals in accordance with the frequency of said data signals, a detector for generating first and second condition signals in accordance with the level of said data signals, first means coupling the output of said discriminator to said emitter for disabling said transistor in response to said discriminator first condition signals, second means coupling the output of said discriminator to said base for overcoming said bias means in response to said discriminator first condition signals, third means coupling the output of said detector to said base for overcoming said bias means in response to said detector first condition signals, first switch means for rendering said first coupling means ineffective, second switch means for rendering said third coupling means ineffective, third switch means for coupling said detector output to said timing means input, and means responsive to said timing means for operating said first switch means, said second switch means and said third switch means.

References Cited by the Examiner

UNITED STATES PATENTS

| | | | |
|---|---|---|---|
| 2,211,750 | 8/1940 | Humby et al. | 178—88 |
| 2,456,825 | 12/1948 | Fitch | 178—88 |
| 2,985,716 | 5/1961 | Day | 178—69 |
| 3,003,031 | 10/1961 | Posthumus | 178—69 |
| 3,113,176 | 12/1963 | Doktor et al. | 178—88 |

NEIL C. READ, *Primary Examiner.*

H. I. PITTS, *Assistant Examiner.*